United States Patent
McCaskill

(10) Patent No.: US 11,428,330 B1
(45) Date of Patent: Aug. 30, 2022

(54) IMPACT RESISTANT EXTERNAL SLEEVE CHOKE

(71) Applicant: NOV Process & Flow Technologies US, Inc., Houston, TX (US)

(72) Inventor: Lane P. McCaskill, Houston, TX (US)

(73) Assignee: NOV Process & Flow Technologies US, inc., Houston, TX (US)

( * ) Notice: Subject to any disclaimer, the term of this patent is extended or adjusted under 35 U.S.C. 154(b) by 0 days.

(21) Appl. No.: 17/249,310

(22) Filed: Feb. 26, 2021

(51) Int. Cl.
| | |
|---|---|
| F16K 3/30 | (2006.01) |
| F16K 3/26 | (2006.01) |
| F16K 47/14 | (2006.01) |
| F16K 47/08 | (2006.01) |
| F16K 27/04 | (2006.01) |
| E21B 34/02 | (2006.01) |

(52) U.S. Cl.
CPC ............... *F16K 3/30* (2013.01); *E21B 34/02* (2013.01); *F16K 3/26* (2013.01); *F16K 27/041* (2013.01); *F16K 47/08* (2013.01); *F16K 47/14* (2013.01)

(58) Field of Classification Search
CPC . F16K 3/30; F16K 3/26; F16K 27/041; F16K 3/024; F16K 47/08; F16K 47/14; E21B 34/02; E21B 34/04
USPC .................................................. 251/118–127
See application file for complete search history.

(56) References Cited

U.S. PATENT DOCUMENTS

| | | | | |
|---|---|---|---|---|
| 2,155,129 A * | 4/1939 | Hall | ....................... | E21B 43/086 29/896.61 |
| 3,087,510 A * | 4/1963 | Normand, Jr. | .......... | F16K 15/18 251/117 |
| 3,813,079 A * | 5/1974 | Baumann | ................ | F16K 47/08 251/282 |
| 4,041,982 A * | 8/1977 | Lindner | ................... | F16K 47/08 137/625.37 |
| 4,402,485 A * | 9/1983 | Fagerlund | ......... | F16L 55/02763 181/254 |
| 4,569,370 A * | 2/1986 | Witt | ......................... | F16K 3/26 137/625.37 |
| 4,679,592 A | 7/1987 | Lamb | | |
| 5,086,808 A | 2/1992 | Pettus | | |
| 5,431,188 A * | 7/1995 | Cove | ....................... | F16K 47/08 251/210 |

(Continued)

FOREIGN PATENT DOCUMENTS

CA        2787408 C        1/2018

OTHER PUBLICATIONS

"CVC Series Choke", © 2020 National Oilwell Varco [online], [retrieved Nov. 24, 2020]. Retrieved from the Internet: <URL: https://www.nov.com/products/cvc-series-choke>, (2020), 7 pgs.

(Continued)

*Primary Examiner* — John Bastianelli
(74) *Attorney, Agent, or Firm* — Schwegman Lundberg & Woessner, P.A.

(57) ABSTRACT

A choke may include an inlet for receiving a flow stream. The choke may also include a valve assembly configured to receive the flow stream from the inlet and control the flow stream. The valve assembly may include a cage element, an external sleeve adapted for selectively and controllably articulating over the cage element to control the flow stream through the valve, and an impact screen surrounding both the cage element and the external sleeve and adapted to protect the cage element and the external sleeve from impacts from large objects in the flow stream. The choke may also include an outlet for delivering the flow stream from the valve assembly.

20 Claims, 6 Drawing Sheets

(56) References Cited

U.S. PATENT DOCUMENTS

| | | | | |
|---|---|---|---|---|
| 6,260,490 | B1* | 7/2001 | Wark | F23K 3/02 |
| | | | | 110/297 |
| 7,426,938 | B2 | 9/2008 | Bohaychuk et al. | |
| 8,490,652 | B2 | 7/2013 | Bohaychuk et al. | |
| 10,012,325 | B2 | 7/2018 | Bohaychuk et al. | |
| 2006/0027779 | A1* | 2/2006 | McGuire | F16K 5/0478 |
| | | | | 137/15.17 |
| 2006/0163517 | A1 | 7/2006 | Bohaychuk et al. | |
| 2011/0209869 | A1* | 9/2011 | Smith | E21B 43/16 |
| | | | | 166/260 |
| 2014/0216176 | A1* | 8/2014 | Kimour | G01N 1/2294 |
| | | | | 73/863.23 |
| 2016/0369629 | A1* | 12/2016 | Zhao | E21D 1/00 |
| 2018/0252073 | A1 | 9/2018 | Richards et al. | |

OTHER PUBLICATIONS

"External Sleeve Control Choke for low-capacity, high-pressure-drop applications", © 2020 Schlumberger Limited [online], [retrieved Nov. 24, 2020]. Retrieved from the Internet: <URL: https://www.slb.com/valves/choke-valves/external-sleeve-choke-valve>, (2020), 4 pgs.

"Plug & Cage Control Choke", © 2020 Schlumberger Limited, [online], [retrieved Nov. 24, 2020]. Retrieved from the Internet: <URL: https://www.slb.com/valves/choke-valves/plug-and-cage-choke-valve>, (2020), 5 pgs.

"International Application Serial No. PCT/US2022/070376, International Search Report dated Mar. 25, 2022", 4 pgs.

"International Application Serial No. PCT/US2022/070376, Written Opinion dated Mar. 25, 2022", 7 pgs.

* cited by examiner

IMPACT RESISTANT EXTERNAL SLEEVE CHOKE

TECHNOLOGICAL FIELD

The present disclosure relates to choke manifolds. More particularly, the present disclosure relates to external sleeve chokes with trim packages for protecting against damage from solids in a fluid stream. Still more particularly, the present disclosure relates to external sleeve chokes having a trim impact cage.

BACKGROUND

The background description provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

Well clean up and flowback is a process performed after wells have been drilled and fracking operations have been used to fracture underground formations such as shale formations. Well clean up may include drilling out frac plugs from the well bore using coiled tubing systems. The remnants of the frac plugs and other debris may be present in the wellbore after this process is complete. Well clean up and flowback may be the initial stages of well production where fluid flows out of the well for the first time. The presence of remnants of frac plugs and other debris in the wellbore may be dealt with by a well clean up process. The process may include fluid flow up the well bore through a casing and to a wellhead where the fluid may be routed through a choke to a reclaiming or storage tank. The choke may be provided to control well pressures and, thus, provided for a more controlled flow of fluid from the wellbore to the tank.

The frac remnants and other debris or relatively large solids in the wellbore can cause damage to the choke. For example, chokes may include plug and cage type chokes where a substantially cylindrical impact cage is provided and the flow control is provided by a plug that articulates into and out of the cylindrical cage. In an external sleeve system, a perforated internal cylinder may be provided and an external solid sleeve may articulate down over the perforated cylinder to close off the ports in the cylinder and control the flow of fluid. It is common for plug and cage systems and external sleeve systems to have tungsten carbide coatings on them to protect against erosive wear from sand and other abrasive materials in fluid flowing out of a well. While tungsten carbide may perform well in abrasive environments, it may be relatively brittle. In the context of well clean up and flowback, the frac remnants and other debris may be relative large and hard objects in the fluid flow. These large hard objects can break the tungsten carbide when the fluid flow enters the choke and the large hard objects impact the trim within the choke.

BRIEF SUMMARY OF THE INVENTION

The following presents a simplified summary of one or more embodiments of the present disclosure in order to provide a basic understanding of such embodiments. This summary is not an extensive overview of all contemplated embodiments and is intended to neither identify key or critical elements of all embodiments, nor delineate the scope of any or all embodiments.

In one or more embodiments, a choke may include an inlet for receiving a flow stream. The choke may also include a valve assembly configured to receive the flow stream from the inlet and control the flow stream. The valve assembly may include a cage element and an external sleeve adapted for selectively and controllably articulating over the cage element to control the flow stream through the valve. The valve assembly may also include an impact screen surrounding both the cage element and the external sleeve and adapted to protect the cage element and the external sleeve from impacts from large objects in the flow stream. The choke may also include an outlet for delivering the flow stream from the valve assembly.

In one or more embodiments, a well clean up system may include a wellhead secured to a well and adapted to receive fluid from the well. The system may also include a reclaiming tank for receiving fluid from the well for disposal or recycling. The system may also include a piping system for conveying the fluid from the wellhead to the reclaiming tank. The piping system may include a choke with an inlet for receiving a flow stream from the well and a valve assembly configured to receive the flow stream from the inlet and control the flow stream. The valve assembly may include a cage element and an external sleeve adapted for selectively and controllably articulating over the cage element to control the flow stream through the valve. The valve assembly may also include an impact screen surrounding both the cage element and the external sleeve and adapted to protect the cage element and the external sleeve from impacts from large objects in the flow stream. The choke may also include an outlet for delivering the flow stream from the valve assembly.

In one or more embodiments, a method of controlling fluid flow from a well may include receiving the fluid flow in a choke valve. The method may also include articulating an external sleeve over a cage element to increase or decrease the available fluid flow area and control the flow of fluid through the choke valve. The method may also include protecting the external sleeve and the cage with an impact screen arranged within the choke valve.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of the present disclosure, it is believed that the invention will be better understood from the following description taken in conjunction with the accompanying Figures, in which:

DETAILED DESCRIPTION

The present disclosure, in one or more embodiments, relates to a choke design particularly adapted for use during well clean up and/or flowback operations. In one or more embodiments, the choke may be an external sleeve choke fitted with an impact screen for protecting the sleeve and cage from impacts by large objects in the fluid flow stream. The impact screen may be a ductile material having a substantial thickness establishing a relatively high impact resistance. The impact screen may also have a selected porosity to avoid passage of large solids that might otherwise impact the external sleeve or the cage and crack or break them. The external sleeve choke may be suitable for well clean up or flowback operations where drilled out frac plugs or other debris may be present in the wellbore due to drilling, (racking, or other earlier activities. The present external sleeve choke may be used in conjunction with plug catchers or it may obviate the need for such devices.

Figure 1:
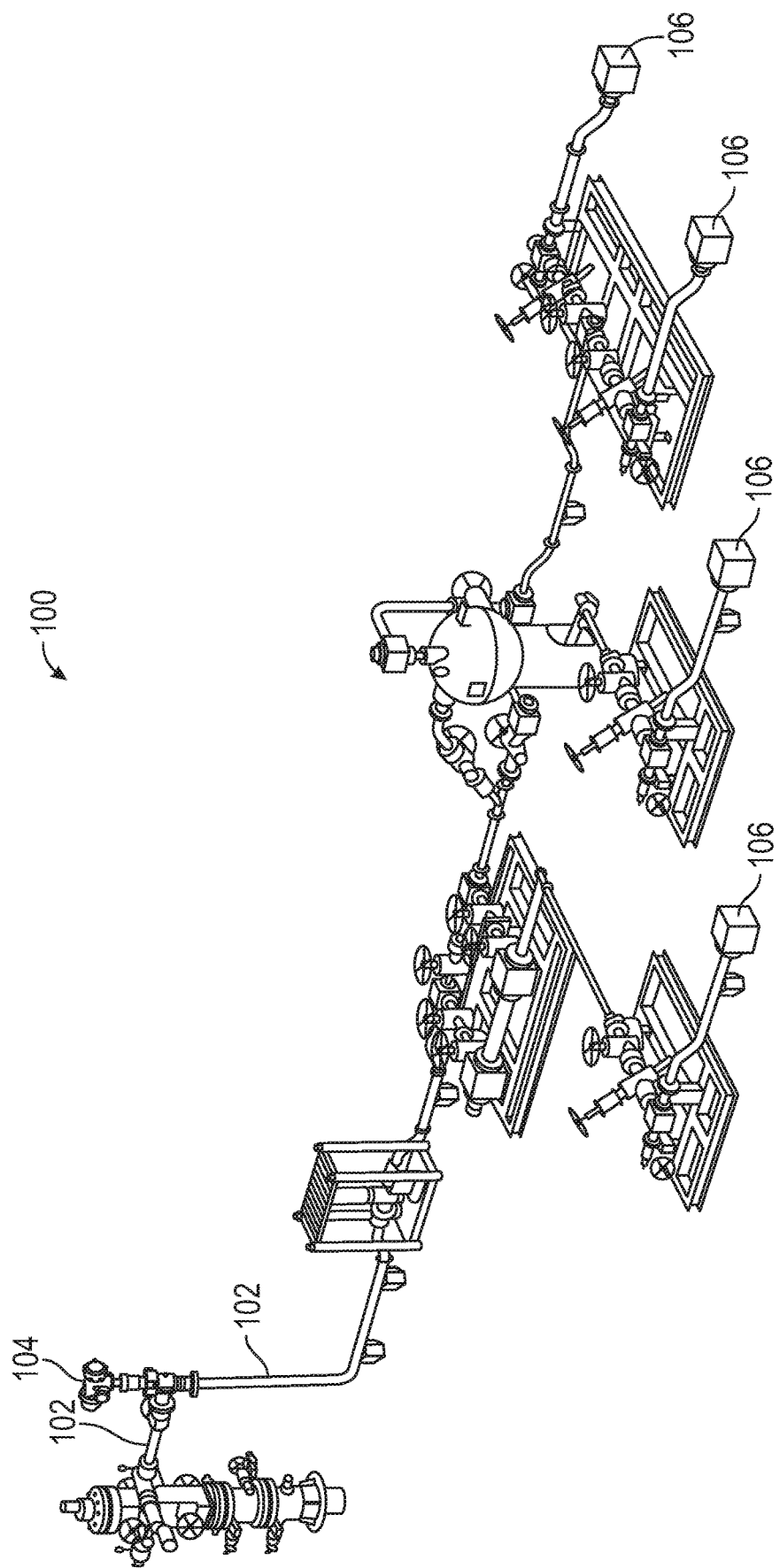
FIG. 1 is a perspective view of a flowback system with an external sleeve choke, according to one or more embodiments.

FIG. 1 is a perspective view of a well clean up or flowback operation 100. As shown, a fluid line 102 may extend from the wellhead 101 to a choke 104 for controlling the pressure of the fluid exiting the well and allowing for the fluid to be reclaimed and/or treated. That is, for example, where frac fluid is present in the well, the frac fluid may be sent to tanks 106 for processing and reuse. However, prior to reaching the tanks 106, the fluid may be processed through a sand separator and/or gas, water, oil separation equipment to isolate the frac fluid from the water and/or sand in the fluid. In any case, the choke 104 may be used to control the fluid flow exiting the well and interacting with these separation processes and, as such, avoid subjecting these processes to excessive or uncontrolled fluid flows and/or pressures.

Figure 2:
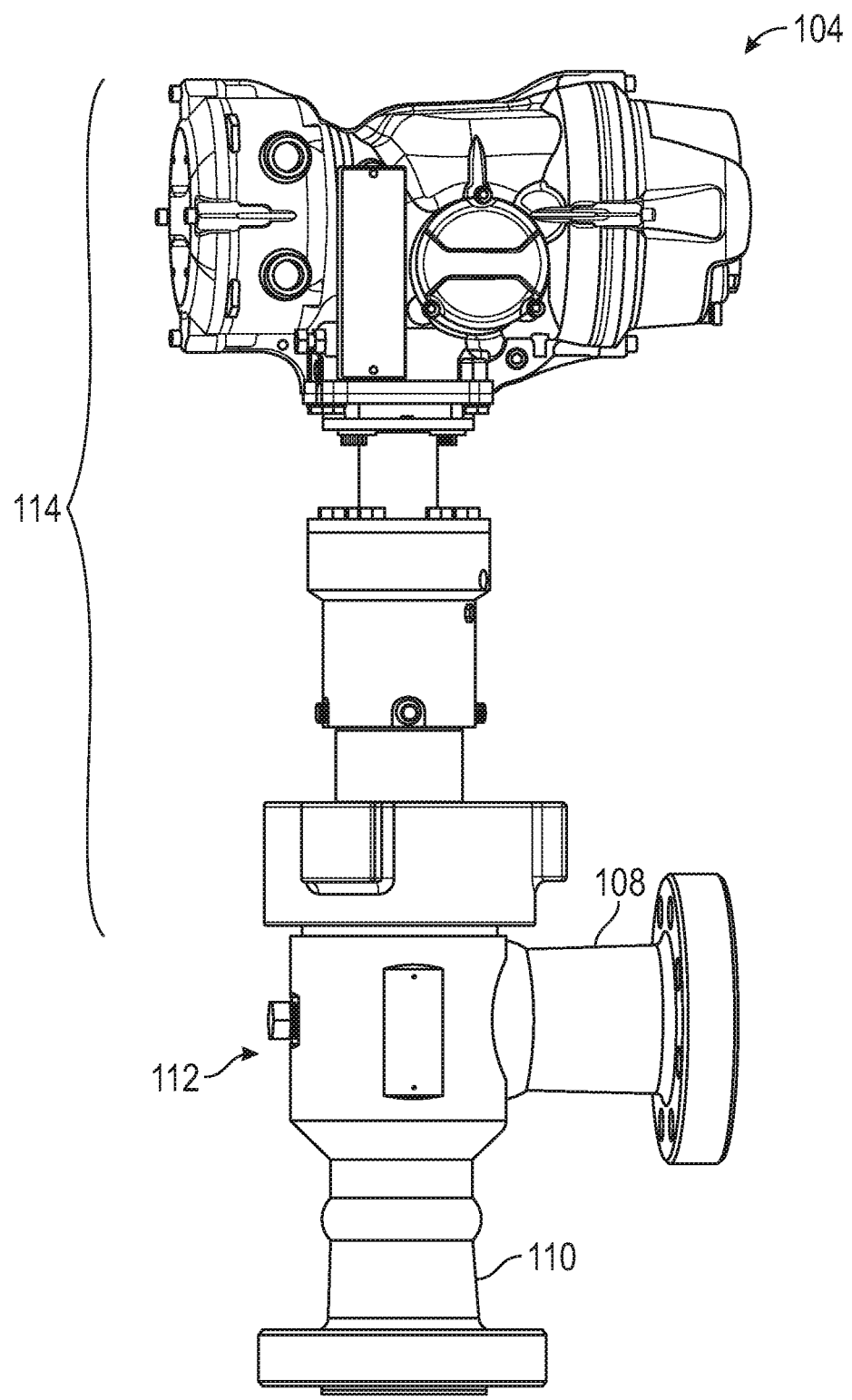
FIG. 2 is a perspective view of the external sleeve choke of FIG. 1, according to one or more embodiments.

Referring now to FIG. 2, a perspective view of an external sleeve choke 104 is shown. The choke may be configured for receiving fluid from the wellbore and controlling the flow of the fluid for downstream equipment and systems. In particular, the choke may control the flow of fluid by controlling the available flow area and either restricting the flow of the fluid or reducing the restriction on the flow of fluid. As shown in FIG. 2 and in cross-section in FIG. 3, the choke may 104 include an inlet 108, an outlet 110, a valve assembly 112, and an actuation system 114.

Figure 3:
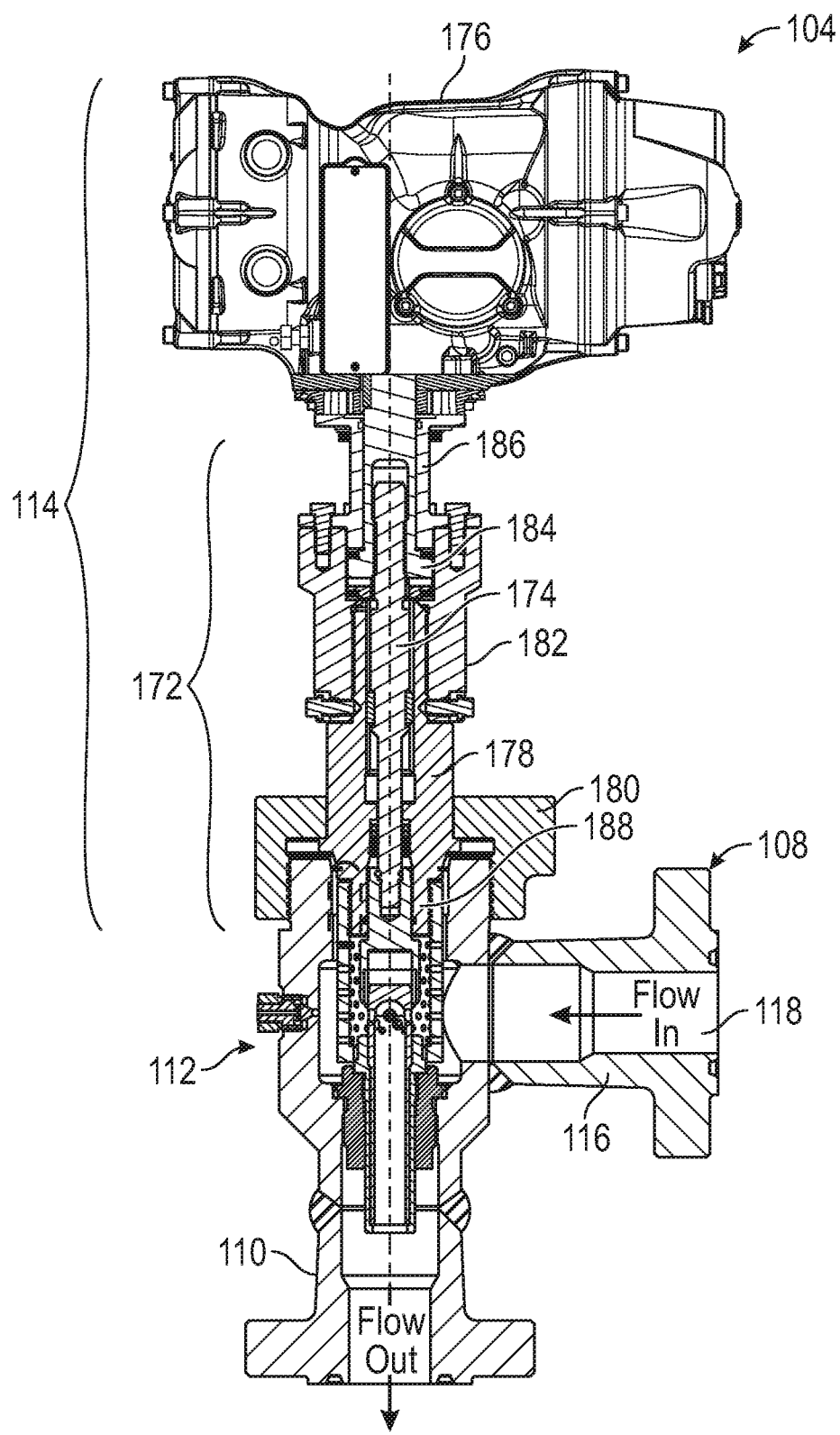
FIG. 3 is a cross-sectional view of the external sleeve choke of FIG. 2.

The inlet 108 may include an inlet body portion 116 having a flow bore 118 extending therethrough. The inlet body portion 116 may include a generally cylindrical body having a piping end and a valve end. The piping end may include an annular flange adapted for bolting to the surrounding piping and allowing the choke 104 to be inserted and/or removed from a piping arrangement. The valve end may include a chamfered edge adapted for welding to the valve body. The flow bore 118 may be sized to receive fluid from adjoining piping at the piping end and, as such, may have a diameter sized the same or similar as the surrounding piping. In one or more embodiments, the flow bore may increase in diameter as fluid flows from the piping end to the valve end. In one or more embodiments, and as shown in FIG. 3, a chamfered transition between a piping diameter and a valve diameter may occur approximately midway along the length of the inlet body flow bore 118. In other embodiments, the transition may be along the full length of the inlet body flow bore. In still other embodiments, a stepped transition may be provided. In one or more embodiments, the inlet body portion may be welded to the valve body as shown in 3. In other embodiments, the inlet body portion may be formed integral with the valve body. In still other embodiments, a flange may be provided on the valve end and a bolted connection may be provided.

The outlet 110 may be the same or similar to the inlet 118, but may be arranged in an opposite manner with respect to the flow direction. That is, fluid may flow into the valve end of the outlet and out the piping end. Other aspects of the outlet may be the same as the inlet including the transition of bore diameters and the like. In one or more embodiments, as shown, the inlet 108 and the outlet 110 may be arranged at approximately or substantially 90 degrees with one another. That is, the flow bore extending through each of the inlet 108 and the outlet 110 may define a central longitudinal axis of each of the inlet 108 and outlet 110 and the longitudinal axes may be arranged at 90 degrees with one another.

Figure 4:
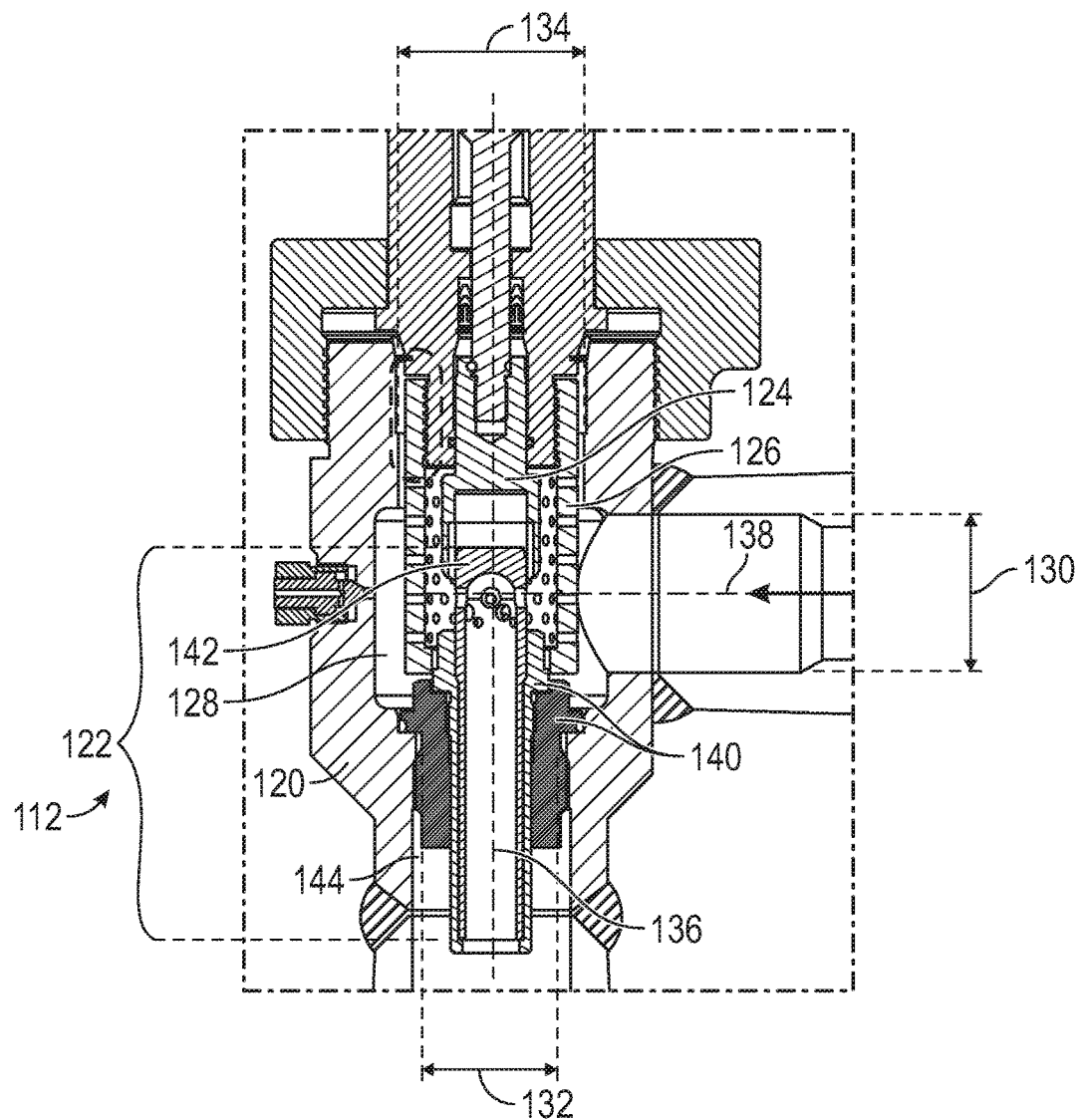
FIG. 4 is a close-up view thereof, according to one or more embodiments.

With continued reference to FIG. 3, the valve assembly 112 may be adapted to receive fluid flow from the inlet 108, control a choke to, in turn, control the flow of fluid through the valve 112, and deliver the fluid to the outlet 110. In particular, the valve may control the available flow area for the fluid and, as such, control the rate of the fluid flow. The valve assembly 112 may, thus, allow for controlling downstream fluid pressures or flows and avoid subjecting downstream systems and equipment to varying well flows or and/or high flows or pressures. A close-up view of the valve assembly 112 is shown in FIG. 4. The working valve portion may be configured for receiving the fluid from the inlet, controlling the flow through the valve via a choke, and delivering the fluid to the outlet. As shown, the valve assembly may include a valve body 120, a cage assembly 122, an external sleeve 124, and an impact screen 126.

The valve body 120 may be adapted to house the working elements of the valve, to create the flow path of fluid through the valve, and to connect to the inlet and the outlet. As shown, the valve body 120 may include a body wall defining a valve cavity 128 and having an inlet opening 130 and an outlet opening 132. The body wall may be a substantially thick-walled mass surrounding and enclosing the valve cavity 128 and adapted to resist relatively high pressures from the well, for example. The valve cavity 128 may be generally centrally arranged within the valve body 120 and may be in fluid communication with the inlet 130 opening and the outlet opening 132 and, as such, in fluid communication with the inlet 108 and the outlet 110. That is, the inlet 108 may be secured to the valve body 120 at the inlet opening 130 and the outlet 110 may be secured to the valve body 120 at the outlet opening 132. In addition to the inlet and outlet openings, the body wall may also include an actuation opening 134 allowing for insertion of the working elements of the valve during manufacturing and for operation of the valve. In one or more embodiments, the valve cavity 128, the inlet opening 130, the outlet opening 132, and the actuation opening 134 may form a T shape where the actuation opening 134 and the outlet opening 132 are vertically aligned with one another along a vertical axis 136 and the inlet opening 130 in conjunction with the inlet 108 forms a flow path having a longitudinal axis 138 intersecting with the vertical axis 136 at approximately or substantially 90 degrees.

The cage assembly is also shown in FIG. 4. The cage assembly 122 may be configured for interacting with the external sleeve to control the flow of fluid through the valve. As shown, the cage assembly may include a seat 140 for engaging a bottom portion of the valve cavity 128 and a cage element 142. The seat 140 may threadably engage an exit bore 144 extending through the valve body 120 beyond the outlet opening 132. In one or more embodiments, the seat 140 may be a multi-part element as shown or a single part may be provided.

The cage element 142 may threadably or frictionally engage the seat 140 so as to secure the cage element 142 in the valve body 120 via the seat 140. Alternatively, the cage element 142 may directly threadably or frictionally engage the exit bore 144 of the valve body 120 and the seat 140 may be omitted. In still other embodiments, the cage element 142 may be compressed or pinched between a seat or bearing surface on a bottom side and a bonnet or other compression element on a top side. In still other embodiments, a bolt or pin may secure the cage element 142 to the bonnet or body of the system.

Figure 5:
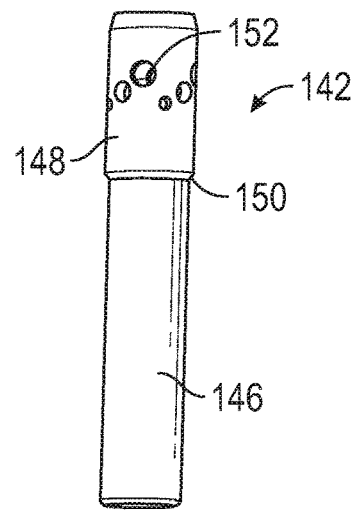
FIG. 5 is a perspective view of a cage element of the choke of 2, according to one or more embodiments.

As shown in FIG. 5, the cage element 142 may include a substantially cylindrical bottom portion 146 and a substantially cylindrical perforated crown portion 148. The perforated crown portion 148 may include a diameter slightly larger than the bottom portion 146 and a chamfered transition 150 may provide for seating the cage element 142 in the seat 140 and/or in the valve body 120. The seat 140 and the cage element 142 may interact to position the cage element 142 such that the bottom portion 146 of the cage element 142 extends through the outlet opening 132 and downward into the exit bore 144. The position may also provide for the perforated crown portion 148 to be positioned in the valve cavity 128. That is, the perforated crown 148 of the cage element 142 may extend upward into the valve cavity 128 above the outlet opening 132 so as to intersect and/or be crossed by the longitudinal axis 138 of the inlet 108. The perforated crown portion 148 may include a plurality of perforations 152 allowing for controlling the flow of fluid through into the perforated crown 148 and downward through the bottom portion 146 of the cage element 142 to the outlet 110. The cage element 142 may be constructed of abrasive resistant materials or may be coated with such materials. For example, the abrasive resistant materials may include tungsten carbide or other relatively hard metals, ceramics, and the like.

Figure 6:
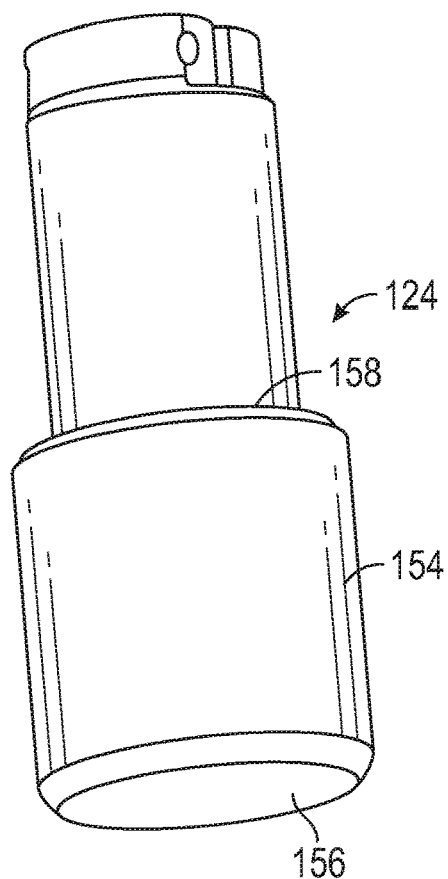
FIG. 6 is a perspective view of an external sleeve of the choke of FIG. 2, according to one or more embodiments.
Figure 7:
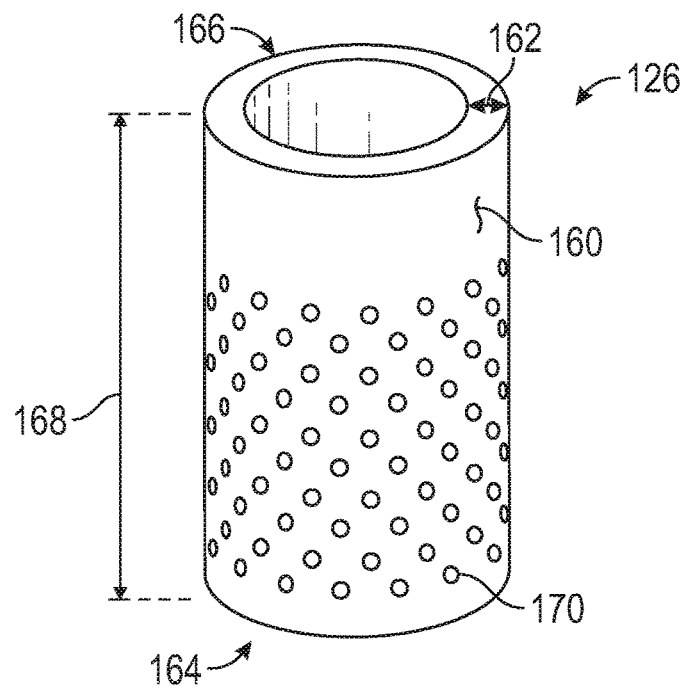
FIG. 7 is a perspective view of an impact screen of the choke of FIG. 2, according to one or more embodiments.

Referring again to FIG. 4, the external sleeve 124 may be adapted to controllably articulate over the perforated crown 148 of the cage element 142 thereby closing off or exposing one or more of the plurality of perforations 152. As shown in isolation in FIG. 6, the external sleeve 124 may include a substantially cylindrical and inverted cup 154. That is, the external sleeve 124 may include a cylinder-shaped element with a cylindrical wall extending downward to an open bottom 156 and upward to a closed top 158. The open bottom 156 may be adapted to receive the perforated crown 148 of the cage element 142 when the sleeve articulates downward causing the cylindrical wall to cover one or more of the plurality of perforations 152. The external sleeve 124 may be suspended in a top portion of the valve cavity 128 and be articulable downward over the perforated crown 148 and back upward to a top portion of the valve cavity 128.

As also shown in FIG. 4, an impact screen 126 may also be provided. The impact screen 126 may be adapted to protect the external sleeve 124 and cage 142. As shown, the impact screen 126 may be a cylindrically shaped element arranged within the valve cavity 128 and in surrounding relationship with the cage assembly 122 and the external sleeve 124. As shown in isolation in FIG. 6, the impact screen 126 may have a cylinder wall 160 having a thickness 162 and defining a bottom 164 and a top 166 of the impact screen 126. In one or more embodiments, the impact screen 126 may include an open top 166 allowing for securing of the impact screen 126 and extension therethrough of actuation elements for the external sleeve 124. The impact screen 126 may also have an open bottom 164 adapted to engage the seat 140 and to allow the cage element 142 to extend upward therethrough. The impact screen 126 may have a height 168 adapted to fit within the valve cavity 128. Moreover, and as shown, approximately ⅓ of the height of the cylinder wall near the top may be substantially solid and may include threading or a friction fit engaging surface on an inside thereof for securing the impact screen to the valve system. The bottom ⅔ of the height of the cylinder wall may include perforations 170 that surround the perforated crown 148 of the cage element 142 and the external sleeve 124. The overall height 168 of the impact screen 126 may be selected to accommodate connection of the impact screen 126 and the stroke length of the external sleeve 124. That is, as shown in FIG. 4, the bottom ⅔ of the height may be sufficient to cover and protect the external sleeve 124 in its retracted position while also protecting the otherwise exposed cage element 142. As the external sleeve 124 moves downward to cover the cage element 142, the impact screen 126 may remain substantially stationary and protect the external sleeve 124 in its deployed condition as well.

In one or more embodiments, the impact screen 126 may include a wall thickness ranging from approximately ⅛ inch to approximately ⅝ inch or from approximately ¼ inch to approximately ½ inch or a wall thickness of approximately ⅜ inch may be provided. In addition, the perforations may have a diameter ranging from approximately 1/16 inch to approximately ⅝ inch or from approximately ⅛ inch to approximately ¼ inch, or a diameter of approximately 3/16 inch may be provided. It is to be appreciated that while round perforations 170 have been shown, other perforation shapes such as square, triangular, rectangular, or other geometries may also be provided. Still further the number of perforations may provide an opening area that is selected based on a relationship between the open area of the impact screen to the open area of the cage element 142. For example, the flow area provided by the perforations 170 may provide an area that is 1.5 to 4 times, 1.75 to 3 times, or approximately 2 times the flow area provided by the perforations 152. Still other ratios may be provided with an eye toward having the cage element 142 restrict the flow and the impact screen catch large objects without restricting the flow as much. The impact screen may be constructed of a ductile material well suited to withstand impacts from large objects in the flow stream without cracking or breaking. In one or more embodiments, the impact screen may include steel, steel alloy, stainless steel, or another relatively ductile material. In one or more embodiments, the impact screen may be a stainless steel such as 17-4 PH Quench-Polish-Quench (QPQ) nitride, for example.

The actuation system 114 may sit atop the valve assembly 112 and may function to operate the external sleeve 124 of the valve assembly 112. In one or more embodiments, and with reference back to FIG. 4, the actuation system 114 may include a bonnet assembly 172, a stem 174, and an actuator 176.

Figure 8:
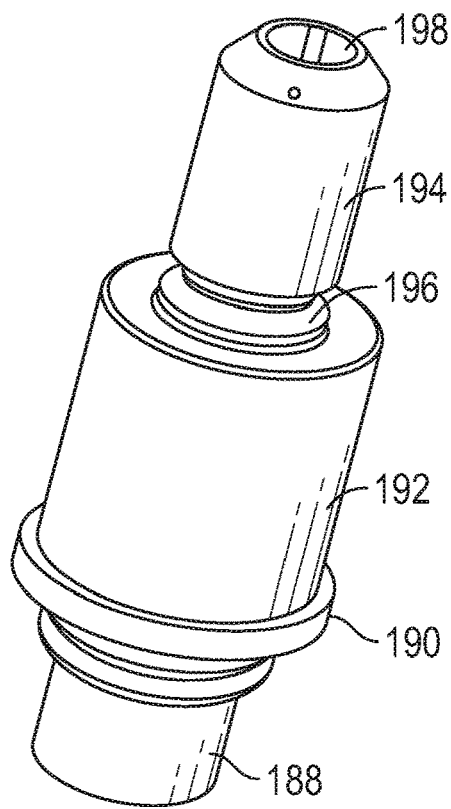
FIG. 8 is a perspective view of a bonnet of the choke of FIG. 2, according to one or more embodiments.
Figure 9:
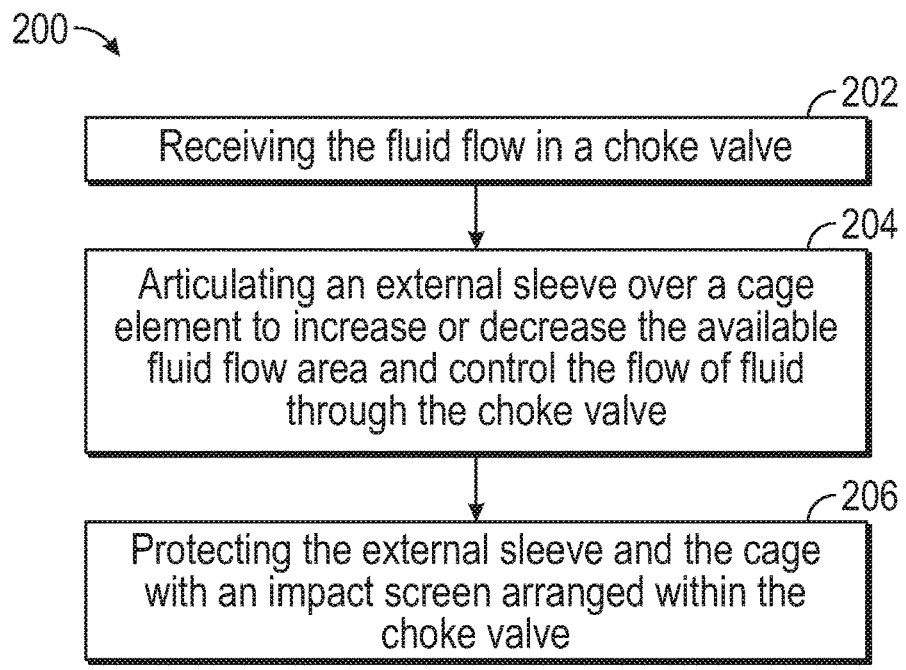
FIG. 9 is a diagram of a method of using a choke, according to one or more embodiments.

The bonnet assembly 172 may be immediately adjacent a top of the valve assembly 112 and may include a bonnet 178, a clamping flange 180, an adapter bonnet 182, a stem nut 184, and a bonnet flange 186. The bonnet 178 may be configured to support or suspend the impact cage 126 within the valve assembly 112 while also allowing the stem 174 to extend therethrough, maintaining a centered position of the stem 174, and maintaining the angular orientation of the stem 174. As shown in FIGS. 4 and 8, the bonnet 178 may include a nipple 188 extending downward into the top of the valve assembly 112, The nipple 188 may have threads on an outer surface thereof for engaging the threads on the inside surface of the impact screen 126. The impact screen 126 may be threaded onto the nipple and the bonnet 178 may be used to insert and support or suspend the impact screen 126 within the valve assembly 112. The bonnet 178 may include a support rib 190 extending around a periphery thereof and adapted to rest on a top surface of the valve assembly 112 to prevent downward motion of the bonnet 178 and impact screen 126 once the impact screen 126 is placed within the valve assembly 112. The bonnet 178 may include a canister 192 extending upward from the support rib 190 and a cylindrical probe 194 extending upward from the canister 192. The probe 194 may include a v-groove 196 near a bottom end thereof just above the canister 192. As shown, the bonnet 178 may also include an internal bore 198 extending therethrough for receiving the stem 174. The bore 198 may include a longitudinal extending keyway within the canister 192 and the probe 194 for keying the stem 174 to the bonnet 178 and preventing relative rotation of the stem 174 and bonnet 178. As shown in FIG. 4, the bore 198 may be adapted to receive the top portion of the external sleeve 124 at a bottom end of the bore allowing the stem 174 to be secured to the external sleeve 124 within the bore 198.

The clamping flange 180 may be adapted to secure the bonnet 178 to the valve assembly 112. As shown, the clamping flange 180 may surround the bonnet 178 and, in particular, have an annular plate adapted to hold the support rib 190 against the valve assembly 112 thereby securing the bonnet 178 to the valve assembly 112. The annular plate may have an inner diameter sized to receive the canister 192 of the bonnet 178. The clamping flange 180 may have a housing extend downward from an outside edge of the annular plate. The housing may have internal threading thereon for threadingly engaging the valve assembly 112 to draw the clamping flange downward toward the valve assembly and sandwich the support rib 190 of the bonnet 178 between the annular plate and the top surface of the valve assembly 112. In one or more embodiments, the clamping flange may include a bolted flange having a plurality of bolts arranged along a bolt circle for securing the clamping flange to the valve body, for example. Still other approaches to securing the clamping flange may be provided.

The adapter bonnet 182 may extend upward from the bonnet 178 and may be adapted to further support the stem 174 and to provide support for a stem nut 184. The adapter bonnet 182 may have a lower bore that allows for securing the adapter 182 to a top of the bonnet 178 by sleeving over the probe 194 and having set screws for engaging the V groove 196 at a bottom end of the probe 194. The adapter bonnet 182 may include an upper bore for receiving a nipple from the bonnet flange 186 and for receiving a stem nut 184.

The bonnet flange 186 may be bolted to the top of the adapter bonnet 182 as shown. The bonnet flange 186 may include a downward extending drive housing having a nipple that engages the upper bore of the adapter bonnet 182 and holds the stem nut 184 in alignment with the adapter bonnet 182. The stem nut 184 may be rotationally operable by the actuator 176 and may extend through the drive housing downward and into the adapter bonnet 182. Within the adapter bonnet 182, the stem nut 184 may threadingly engage a top end of the stem 174.

The stem 174 may extend upward from the external sleeve 124 and may be adapted to articulate up and down relative to the valve assembly 112 and the bonnet 178 based on actuator activity. As shown, the stem 174 may be an elongate element extending upward from the external sleeve 124 through the bonnet 178, through the adapter bonnet 182, and may extend slightly above the adapter bonnet 182. The stem 174 may include keyway slots on the sides of the stem to rotationally secure the stem to the surrounding elements via keys and preventing rotation of the stem 174, but allowing longitudinal motion of the stem 174. At a top end thereof, the stem 174 may include a threaded outer surface for engagement by the stem nut 184.

The actuator 176 may sit atop the bonnet flange 186. The actuator may be secured to the adapter bonnet 182 with the bonnet flange 186 thereby preventing relative rotation of the actuator 176 and the bonnet flange. The actuator 176 may rotationally engage the stem nut 184 and may provide rotational operability to the stem nut 184. For example, an electric rotational motor, as shown, or an otherwise powered motor or manual rotating handle or wheel may be provided for the actuator 176. When the actuator 176 rotates the stem nut 184, the stem nut 184 may rotate within the bonnet flange 186 and the top of the adapter bonnet 182 and the threaded engagement with the stem 174 may drive the stem 174 downward or pull the stem 174 upward depending on the rotation direction. That is, the keyed connection between the stem 174 and the bonnet assembly 172 may prevent rotation of the stem 174 and rotation of the stem nut 184, may thus cause longitudinal motion of the stem 174 via the threaded engagement.

In operation and use, the above described choke may be used for well clean up and flowback operations where large solids may be present in the fluid flowing from the well. The choke may be provided downstream of the wellhead, but upstream of more sensitive equipment. The external sleeve within the choke may be used to control the flow of fluid through the choke by articulating the external sleeve between a fully surrounding position on the cage element and a fully uncovered position. Further adjustment of the fluid flow may be provided by partially surrounding and partially uncovering the cage element with the sleeve. The impact screen may protect the external sleeve and cage from impact by large objects in the fluid flow stream. Due to the impact screen's relatively ductile material, the impact screen may be better suited for managing the impacts from large objects in the flow stream and may generally avoid cracking or breaking. Moreover, the impact screen may be a relatively easily replaceable component such that when abrasives in the fluid flow wear on the impact screen and cause the plurality of orifices in the impact screen to become too large, the impact screen may be easily and cost effectively replaced. As the large objects contact the impact screen they may break down to objects that are small enough to pass through the impact screen. The objects may also bounce around the annulus area around the impact screen until they are small enough to pass through the impact screen and of a size that is less likely to damage the external sleeve and cage element.

In view of the above, a method of controlling fluid flow from a well (200) may include receiving the fluid flow in a choke valve (202). The method may also include articulating an external sleeve over a cage element to increase or decrease the available fluid flow area and control the flow of fluid through the choke valve (204). The method may also include protecting the external sleeve and the cage with an impact screen arranged within the choke valve (206).

As used herein, the terms "substantially" or "generally" refer to the complete or nearly complete extent or degree of an action, characteristic, property, state, structure, item, or result. For example, an object that is "substantially" or "generally" enclosed would mean that the object is either completely enclosed or nearly completely enclosed. The exact allowable degree of deviation from absolute completeness may in some cases depend on the specific context. However, generally speaking, the nearness of completion will be so as to have generally the same overall result as if absolute and total completion were obtained. The use of "substantially" or "generally" is equally applicable when used in a negative connotation to refer to the complete or near complete lack of an action, characteristic, property, state, structure, item, or result. For example, an element, combination, embodiment, or composition that is "substantially free of" or "generally free of" an element may still actually contain such element as long as there is generally no significant effect thereof.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

Additionally, as used herein, the phrase "at least one of [X] and [Y]," where X and Y are different components that may be included in an embodiment of the present disclosure, means that the embodiment could include component X without component Y, the embodiment could include the component Y without component X, or the embodiment could include both components X and Y. Similarly, when used with respect to three or more components, such as "at least one of [X], [Y], and [Z]," the phrase means that the embodiment could include any one of the three or more components, any combination or sub-combination of any of the components, or all of the components.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principals of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

What is claimed is:

1. A choke, comprising:
   an inlet for receiving a flow stream;
   a valve assembly configured to receive the flow stream from the inlet and control the flow stream, the valve assembly comprising:
   a cage element comprising a first plurality of perforations;
   an external sleeve adapted for selectively and controllably articulating over the cage element to control the flow stream through the valve; and
   an impact screen fully surrounding both the cage element and the external sleeve along the flow path and adapted to protect the cage element and the external sleeve from impacts from large objects in the flow stream, the impact screen comprising a second plurality of perforations that are smaller than the first plurality of perforations; and
   an outlet for delivering the flow stream from the valve assembly.

2. The choke of claim 1, wherein the impact screen comprises a cylindrical wall having the second plurality of perforations.

3. The choke of claim 2, wherein the cylindrical wall comprises a thickness of approximately ⅜ inch.

4. The choke of claim 2, wherein the second plurality of perforations have a diameter ranging from approximately ⅛ inch to approximately ¼ inch.

5. The choke of claim 2, wherein the cage element comprises a restricted flow area and the second plurality of perforations provide a flow area approximately twice the area of the restricted flow area.

6. The choke of claim 2, wherein the impact screen comprise a ductile material.

7. The choke of claim 1, further comprising a bonnet assembly, a stem, and an actuator for articulating the stem to control the position of the external sleeve.

8. The choke of claim 7, wherein the impact screen is secured to the bonnet assembly to hold the impact screen within the valve assembly.

9. The choke of claim 7, wherein the stem includes a keyed connection to the bonnet assembly.

10. The choke of claim 9, wherein the bonnet assembly comprises a stem nut rotatable by the actuator to advance or retract the stem.

11. A well clean up system comprising:
    a wellhead secured to a well and adapted to receive fluid from the well;
    a reclaiming tank for receiving fluid from the well for disposal or recycling; and
    a piping system for conveying the fluid from the wellhead to the reclaiming tank, the piping comprising a choke comprising:
    an inlet for receiving a flow stream from the well;
    a valve assembly configured to receive the flow stream from the inlet and control the flow stream, the valve assembly comprising:
    a cage element comprising a first plurality of perforations;
    an external sleeve adapted for selectively and controllably articulating over the cage element to control the flow stream through the valve; and
    an impact screen fully surrounding both the cage element and the external sleeve along the flow path and adapted to protect the cage element and the external sleeve from impacts from large objects in the flow stream, the impact screen comprising a second plurality of perforations that are smaller than the first plurality of perforations; and an outlet for delivering the flow stream from the valve assembly.

12. The well clean up system of claim 11, wherein the impact screen comprises a cylindrical wall having the second plurality of perforations.

13. The well clean up system of claim 12, wherein the cylindrical wall comprises a thickness of approximately ⅜ inch.

14. The well clean up system of claim 12, wherein the second plurality of perforations have a diameter ranging from approximately ⅛ inch to approximately ¼ inch.

15. The well clean up system of claim 12, wherein the cage element comprises a restricted flow area and the second plurality of perforations provide a flow area approximately twice the area of the restricted flow area.

16. The well clean up system of claim 12, wherein the impact screen comprises a ductile material.

17. A method of controlling fluid flow from a well, the method comprising:

receiving the fluid flow in a choke valve;

articulating an external sleeve over a cage element comprising a first plurality of perforations to increase or decrease the available fluid flow area and control the flow of fluid through the choke valve; and protecting the external sleeve and the cage with an impact screen arranged within the choke valve and comprising a second plurality of perforations smaller than the first plurality of perforations, wherein the impact screen fully surrounds both the cage element and the external sleeve along the path of the fluid flow.

18. The method of claim 17, wherein the impact screen comprises a cylindrical wall having the second plurality of perforations.

19. The method of claim 18, wherein the cylindrical wall comprises a thickness of approximately ⅜ inch.

20. The method of claim 18, wherein the second plurality of perforations have a diameter ranging from approximately ⅛ inch to approximately ¼ inch.

* * * * *